United States Patent [19]

Gibbs

[11] 4,085,767

[45] Apr. 25, 1978

[54] REVERSE FLOW VALVE FOR PNEUMATIC SYSTEMS

[75] Inventor: James Whitman Gibbs, Hialeah, Fla.

[73] Assignee: Gibbs-Ryder Materials Handling Systems, Inc., Hialeah, Fla.

[21] Appl. No.: 634,135

[22] Filed: Nov. 21, 1975

[51] Int. Cl.² .................... F16K 45/00; G05D 11/03
[52] U.S. Cl. .................... 137/102; 137/115; 137/107
[58] Field of Search ............ 137/101, 102, 115, 118, 137/107

[56] References Cited

U.S. PATENT DOCUMENTS

| 2,367,682 | 1/1945 | Keble | 137/102 X |
|---|---|---|---|
| 2,579,439 | 12/1951 | Noe | 137/107 |
| 2,610,859 | 9/1952 | Wilcox et al. | 137/102 |
| 3,086,542 | 4/1963 | Mosier | 137/102 |
| 3,419,030 | 12/1968 | Gratzmuller | 137/102 |
| 3,606,904 | 9/1971 | Taylor | 137/102 |
| 3,707,981 | 1/1973 | Sadler et al. | 137/118 X |

FOREIGN PATENT DOCUMENTS

| 1,318,869 | 5/1973 | United Kingdom | 137/102 |

*Primary Examiner*—William R. Cline
*Attorney, Agent, or Firm*—Hamilton, Renner & Kenner

[57] ABSTRACT

A reversible valve for selectively delivering a pressurized gaseous mixture to and exhausting it from a reversible air motor or other pressure operated device. The valve has a perforate piston actuated by introducing the pressurized gas to a through flow position closing off lateral exhaust ports and actuated by the pressurized gas and a spring to a position fully opening the exhaust ports when flow to the valve is reversed.

12 Claims, 2 Drawing Figures

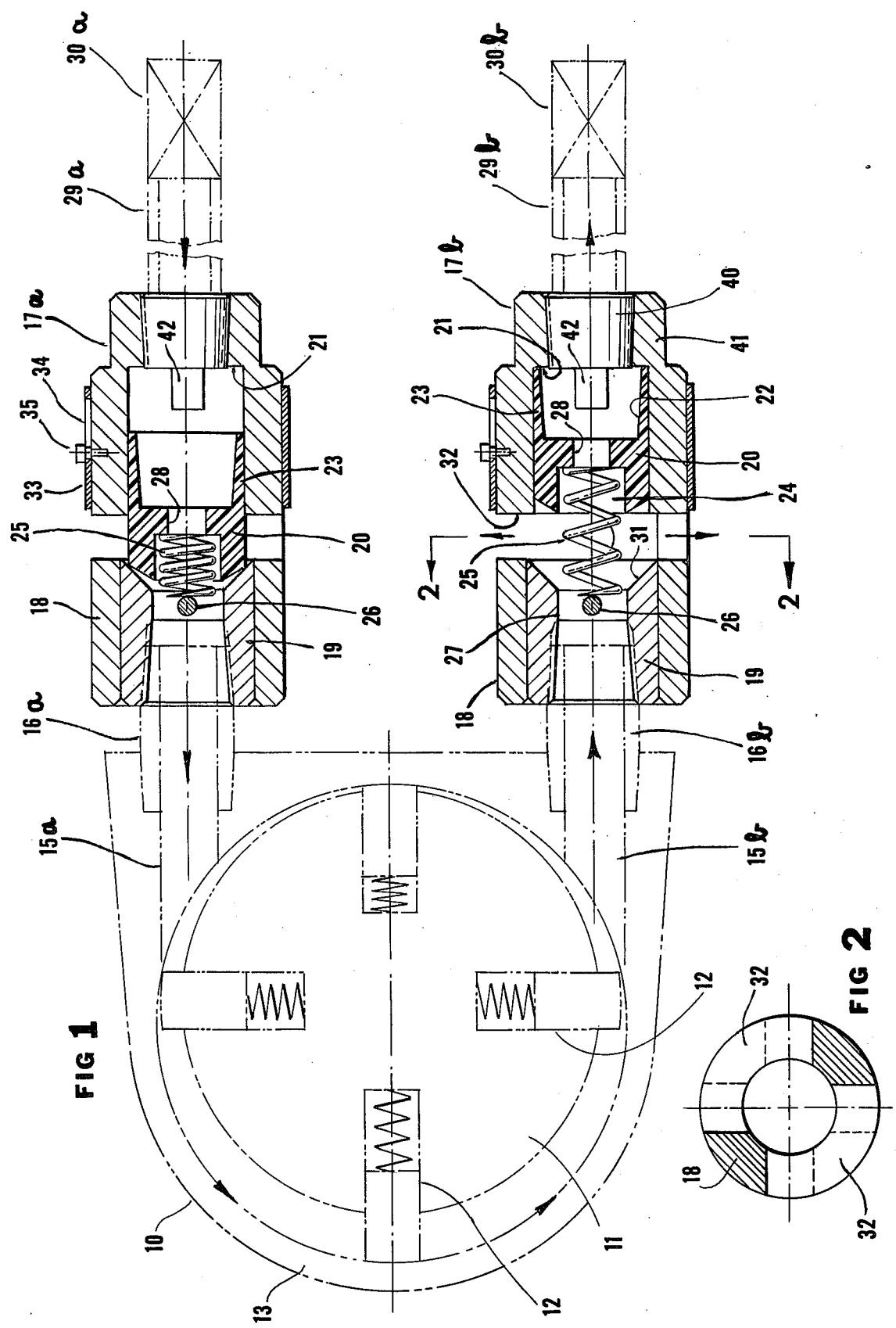

REVERSE FLOW VALVE FOR PNEUMATIC SYSTEMS

BACKGROUND OF THE INVENTION

In certain prior pneumatic systems for operating reversible air motors known to the art complex, relatively large and expensive valves are required to handle reverse flow as it is essential that the air flow on the exhaust side of the motor is not restricted and does not create back pressure on the motor as this detracts from or destroys the torque of the motor. The conventional reversible piston type valves of which I am aware are not suitable for this purpose because of failure to provide unrestricted exhaust flow with no back pressure due to various deficiencies such as inadequate or unrestricted exhaust orifice capacity or lack of positive movement of the piston to the full open position.

The present invention is also applicable to pneumatic systems involving relatively large air cylinders having reversible pistons wherein a small escape hole or vent is provided in the cylinder to provide for the controlled escape of air during the return stroke of the piston. These small holes tend to become clogged with liquid, grease or foreign matter, such that the cylinder operation is adversely affected.

SUMMARY OF THE INVENTION

It is an object of the present invention to provide an improved reverse flow valve which will repeatedly and reliably assure full and unrestricted exhaust flow through the valve.

Another and more specific object is to provide an improved reversible valve adapted selectively for delivering pressurized air or gas to and exhausting it unrestrictedly from an air motor without creating back pressure on the motor.

A further object is to provide an improved pneumatic valve having a reversible piston and a spring positively biasing the piston to the fully open exhaust position.

Another object is to provide an improved reverse flow pneumatic valve having a spring-biased piston, and means for diverting flow to the exhaust orifices.

A still further object is to provide an improved reverse flow pneumatic valve having nozzle means for introducing pressurized air interiorly of the piston to pressure seal the exterior thereof against the valve housing.

These and other objects are accomplished by the improvements comprising the present invention, a preferred embodiment of which is shown by way of example in the accompanying drawings and described in detail in the following specification. Various modifications and changes in details of construction are comprehended within the scope of the appended claims.

In general, a reversible valve employing the concepts of the present invention is useful in delivering a pressurized gaseous mixture to and exhausting it from a pressure operated device such as an air motor and includes, a housing having lateral exhaust openings, a piston axially movable in the housing to open and close the exhaust openings, a port extending through the piston, and a spring operative with flow of gaseous mixture from the pressure operated device to move the piston to open the exhaust openings, the piston being movable with flow of the gaseous mixture to the pressure operated device against the action of the spring to close the exhaust openings and transmit the gaseous mixture through the piston port.

BRIEF DESCRIPTION OF THE DRAWINGS

FIG. 1 is a somewhat schematic depiction of a pneumatic air motor connected in exemplary operative arrangement with two reversible valves, according to the concepts of the present invention, shown in longitudinal section.

FIG. 2 is a sectional view of a reversible valve according to the present invention taken substantially along the line 2—2 of FIG. 1.

DESCRIPTION OF A PREFERRED EMBODIMENT

As shown by way of example in the drawings, a pair of the valves embodying the present invention is used in the pressure and exhaust lines for operating a reversible air motor. It will be understood that these valves are also adapted for use in various types of air pressure operated systems, such as for example pressure cylinder arrangements which normally employ small escape holes for exhausting air. The present valve would replace the small holes, which tend to become clogged, thereby providing a controlled input and output in two directions.

The reversible air motor, indicated generally by the numeral 10 in FIG. 1, is merely exemplary of numerous conventional designs well known in the art and includes a rotor 11 with radially outwardly biased vanes 12 mounted eccentrically of housing 13 for rotation in the chamber formed thereby. Tangential inlet and outlet ports 15a and 15b in the housing are connected to the rotor chamber, the port 15a acting as the pressure inlet port and the port 15b as the exhaust port in the operational mode depicted in FIG. 1.

Conduits 16a and 16b connect the ports 15a and 15b, respectively, to the improved reverse flow valves, indicated generally by the numerals 17a and 17b. Each valve has a tubular housing 18 with one end adapted for connection with air motor 10, as by a bushing 19 fitted into the bore of the housing 18 in the end facing the air motor 10, the connecting conduits 16a and 16b being threaded into the respective bushings 19 or otherwise sealingly attached thereto.

A piston 20, which is preferably cup-shaped at either end, is slidably mounted in the bore of the housing 18 between the bushing 19 and an annular shoulder 21 proximate the opposite end of the housing. The cup-shaped end of the piston 20 adjacent the shoulder 21 has a recess 22 therein formed preferably by a tapered outer annular wall 23. The other cup-shaped end of the piston 20 has an axial recess 24 therein which may be substantially cylindrical and of sufficient extent for telescopically receiving and centering one end of a helical compression spring 25, the other end of which abuts a transverse diverter pin 26 secured in the axial opening 27 of bushing 19. An axial flow port 28 extends through the central wall of the piston 20 between the recesses 22 and 24 of the piston. The flow port 28 controls the quantitative delivery of air to the motor 10. Since the unrestricted exhausting of air from the motor 10 is of significance in the context of the present invention, it is advantageous that flow port 28 be of minimum size for optimum operation of the air motor 10 to thereby minimize the quantity of air to be exhausted.

The reduced end of each valve housing 18 adjacent the annular shoulder 21 is selectively connected to and disconnected from a source (not shown) of a pressurized gaseous mixture. As used herein the term gaseous mixture includes air and mixes of various gases, with the possibility of some extent of liquid components. A conventional air compressor has been found to serve satisfactorily as the source. The connection of housing 18 to the gaseous mixture source may be effected by supply conduits 29a and 29b having conventional two-way control valves 30a and 30b therein. For an air compressor source system, reliable results have been achieved with an aluminum valve housing 18 and a piston 20 fabricated of polyurethane. The piston 20 may predictably be made of other elastomeric materials of comparable properties, including a tolerance for oil. The materials employed in both valve housing 18 and piston 20 may be selected from other materials which would be evident to a person skilled in the art dependent upon the environment in which the flow valves are to be employed.

Preferably, the inner end of bushing 19 is inwardly tapered as shown at 31 and the housing wall 18 immediately adjacent thereto is provided with lateral exhaust openings 32 which in a preferred form may be opposed arcuate slots as best seen in FIG. 2. Alternatively, two pairs of diametrically opposed through bores in housing 18 or other slotting may be employed so long as sufficient capacity is provided to eliminate back pressure. When the piston 20 is in the exhaust position, as shown in valve 17b, the exhaust flow pressure from motor 10 coupled with the pressure of spring 25 urges the piston against the shoulder 21 and the axial opening 27 of bushing 19 is in communication with exhaust openings 32. The diverter pin 26, in addition to axially retaining the end of spring 25, is appropriately located proximate the inner end of axial opening 27 and preferably extends substantially diametrically of axial opening 27 of bushing 19 so that impinging exhaust flow will be diverted generally outwardly toward the inwardly tapered end of the bushing 19 to the exhaust openings 32.

The diverter pin 26 lessens the exhaust flow traveling axially through the spring 25 and the piston flow port 28 which would tend to build up deleterious back pressure on the other side of the piston. Further, in the exhaust position of valve 17b with control valve 30b closed, the exhaust flow from the air motor 10 is wholly unrestricted, as the capacity of the exhaust openings 32 substantially exceeds that of conduit 16b, so that no back pressure is created to lessen the torque of the motor 10. If desired, however, provision may be made for controlling the torque of the motor 10 by altering the effective size of the exhaust openings 32. As shown, a cylindrical sleeve 33 is positioned about the housing 18 for selective positioning axially thereof by means of an elongate slot 34 in sleeve 33 which accommodates a set screw 35. The sleeve 33 may thus be positioned to close a desired portion of exhaust openings 32 and secured against accidental movement by tightening the set screw 35.

A nozzle insert bushing 40 is attached to the reduced end 41 of the housing 18 and the conduit 29a or 29b is connected thereto. The bushing 40 has an inner axial nozzle tube 42 which in the exhaust position of valve 17b extends substantially into the recess 22 of the piston 20. The purpose of nozzle tube 42 is to insure that when flow is reversed by supplying pressurized air to valve 17b via conduit 29b, the air entering the chamber formed by recess 22 through nozzle 42 will be introduced substantially axially within the recess and thereby immediately force the flexible tapered annular wall 23 radially outward to form a pressure seal against the bore of the housing 18 as the piston 20 is moved by the incoming pressure to the position of valve 17a where the beveled inner end of the piston 20 seats against the matingly inwardly tapered surface 31 of the bushing 19 whereby the exhaust openings are completely closed off.

In the operation of the system with control valve 30a open and 30b closed, the speed of the air motor 10 is regulated by the size of the axial flow port 28 transmitting pressurized gaseous mixture through the piston 20 in the through flow position of valve 17a. In the exhaust position of valve 17b the flow through the port 28 is minimal because any back pressure buid-up in conduit 29b is more than overbalanced by the exhausting air on the other side of the piston. When flow is reversed and the valve is in the through flow position of valve 17a, the spring 25 immediately and positively insures that the piston moves from the position of 17a to the position of 17b so that there is no tendency of the piston to "hang up" in a throttling position only partially uncovering the openings 32 and thereby restricting exhaust flow from the motor 10.

Thus, it should be apparent from the foregoing description of the preferred embodiment of the present invention that the reversible valve herein described accomplishes the above-enumerated and other objects of the invention.

I claim:

1. A reversible valve for selectively delivering a pressurized gaseous mixture to and exhausting it from a pressure operated device comprising; housing means having bore means therein, a pair of spaced port means in said housing means, one of said pair of spaced port means connected with the pressure operated device, lateral exhaust opening means in said housing means interposed between said pair of spaced port means, a piston axially movable in said bore means of said housing means to open and close said exhaust opening means, flow port means in said piston establishing flow communication for the gaseous mixture through said bore means in said housing means between said pair of spaced port means, diverter means in said bore means of said housing means and positioned between said one of said pair of spaced port means and lateral exhaust opening means directing flow of gaseous mixture from the pressure operated device to said exhaust opening means in said housing means, and biasing means operative with flow of gaseous mixture from the pressure operated device through said one of said pair of spaced port means to move said piston to open said exhaust opening means for the discharge of gaseous mixture therethrough, said piston movable with flow of the gaseous mixture to the pressure operated device against the action of said biasing means to close said exhaust opening means and transmit the gaseous mixture through said pair of spaced port means and said flow port means.

2. A reversible valve according to claim 1, wherein said diverter means is a pin positioned diametrically of said housing means.

3. A reversible valve according to claim 2, wherein said housing means has a bushing terminating at said exhaust opening means in which said pin is positioned.

4. A reversible valve according to claim 3, wherein said bushing is tapered adjacent said exhaust opening means to engage a mating surface of said piston.

5. A reversible valve according to claim 1, wherein said piston has a recess in the end in which gaseous mixture is introduced for flow to the pressure operated device.

6. A reversible valve according to claim 5, wherein the recess is formed by a flexible wall for sealingly engaging the bore of said housing means.

7. A reversible valve according to claim 6, wherein a nozzle is provided to introduce the gaseous mixture within said recess to maintain sealing engagement between said housing means and said piston.

8. A reversible valve according to claim 1, wherein said exhaust opening means comprises two opposed arcuate slots.

9. A reversible valve according to claim 1, including means to selectively close a portion of said exhaust opening means to control the amount of a pressurized gaseous mixture exhausted from the pressure operated device.

10. A reversible valve according to claim 9, wherein said means to selectively close a portion of said exhaust opening means is a sleeve which is secured axially of said housing means.

11. A reversible valve for selectively delivering a pressurized gaseous mixture to and exhausting it from a pressure operated device comprising; housing means having bore means therein, a pair of spaced port means in said housing means, one of said pair of spaced port means connected with the pressure operated device, lateral exhaust opening means in said housing means interposed between said pair of spaced port means, a piston axially movable in said bore means of said housing means to open and close said exhaust opening means, flow port means in said piston establishing flow communication for the gaseous mixture through said bore means in said housing means between said pair of spaced port means, and biasing means operative with flow of gaseous mixture from the pressure operated device through said one of said pair of spaced port means to move said piston to open said exhaust opening means for the discharge of gaseous mixture therethrough said biasing means being a helical compression spring interposed between a diverter pin and said piston within said bore of said housing means, said piston movable with flow of the gaseous mixture to the pressure operated device against the action of said biasing means to close said exhaust opening means and transmit the gaseous mixture through said pair of spaced port means and said flow port means.

12. A reversible valve according to claim 11, wherein one end of said spring abuts said diverter pin and the other end extends telescopically in a recess in said piston.

* * * * *